US009420737B2

(12) United States Patent
Spiller et al.

(10) Patent No.: US 9,420,737 B2
(45) Date of Patent: Aug. 23, 2016

(54) THREE-DIMENSIONAL ELEVATION MODELING FOR USE IN OPERATING AGRICULTURAL VEHICLES

(71) Applicant: Trimble Navigation Limited, Sunnyvale, CA (US)

(72) Inventors: Stephanie Anne Spiller, Denver, CO (US); Jeffrey Hamilton, Broomfield, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 14/469,790

(22) Filed: Aug. 27, 2014

(65) Prior Publication Data

US 2016/0057920 A1   Mar. 3, 2016

(51) Int. Cl.
| | |
|---|---|
| *G01S 5/16* | (2006.01) |
| *A01B 69/04* | (2006.01) |
| *G05D 1/02* | (2006.01) |
| *A01B 79/00* | (2006.01) |
| *G01C 21/00* | (2006.01) |

(52) U.S. Cl.
CPC ........... *A01B 69/008* (2013.01); *A01B 79/005* (2013.01); *G01C 21/00* (2013.01); *G05D 1/021* (2013.01); *G05D 1/0287* (2013.01)

(58) Field of Classification Search
CPC . E01C 19/004; A01B 79/005; A01B 69/007; G06F 17/30241; G01B 11/26; G01C 15/00; G01S 5/16
USPC ............... 701/23, 50, 408, 409, 472, 25, 41; 703/6, 9; 37/197; 382/103, 195; 702/151
See application file for complete search history.

(56) References Cited

U.S. PATENT DOCUMENTS

| | | | | |
|---|---|---|---|---|
| 4,700,301 A | * | 10/1987 | Dyke | G01S 5/16 180/169 |
| 5,646,844 A | * | 7/1997 | Gudat | E01C 19/004 701/409 |
| 6,463,374 B1 | * | 10/2002 | Keller | A01B 69/007 111/200 |
| 6,728,607 B1 | | 4/2004 | Anderson | |
| 7,991,575 B2 | * | 8/2011 | Vogel | G01B 11/26 356/154 |
| 2009/0099774 A1 | * | 4/2009 | Takac | A01B 79/005 701/472 |
| 2009/0164067 A1 | * | 6/2009 | Whitehead | A01B 79/005 701/41 |
| 2011/0064312 A1 | * | 3/2011 | Janky | G01C 15/00 382/195 |
| 2012/0101796 A1 | * | 4/2012 | Lindores | G06F 17/30241 703/9 |
| 2012/0163656 A1 | * | 6/2012 | Wang | G01C 15/00 382/103 |
| 2012/0166137 A1 | * | 6/2012 | Grasser | G01C 15/00 702/150 |

(Continued)

FOREIGN PATENT DOCUMENTS

WO   WO 00/58800 A1   10/2000
WO   WO 2007/050192 A2   5/2007

(Continued)

OTHER PUBLICATIONS

International Search Report and Written Opinion prepared by the European Patent Office as International Searching Authority for PCT International Patent Application No. PCT/US2015/046347 mailed Nov. 20, 2015; 13 pages.

*Primary Examiner* — Yuri Kan
(74) *Attorney, Agent, or Firm* — Swanson & Bratschun, L.L.C.

(57) ABSTRACT

Novel tools and techniques for creating and implementing three-dimensional guidance paths for use in conjunction with more or one agricultural vehicles operating in an area of operation.

23 Claims, 4 Drawing Sheets

(56) References Cited

U.S. PATENT DOCUMENTS

| | | | |
|---|---|---|---|
| 2012/0174445 A1* | 7/2012 | Jones | A01B 69/007 37/197 |
| 2013/0046525 A1* | 2/2013 | Ali | A01B 79/005 703/6 |
| 2014/0146173 A1 | 5/2014 | Joyce et al. | |
| 2015/0268043 A1 | 9/2015 | McFadden et al. | |
| 2015/0276402 A1 | 10/2015 | Grasser et al. | |

FOREIGN PATENT DOCUMENTS

| | | |
|---|---|---|
| WO | WO 2011/131382 A1 | 10/2011 |
| WO | WO 2013/063106 A2 | 5/2013 |
| WO | WO 2014/055428 A2 | 4/2014 |
| WO | WO 2014/055430 A2 | 4/2014 |
| WO | WO 2016/032901 A1 | 3/2016 |

* cited by examiner

THREE-DIMENSIONAL ELEVATION MODELING FOR USE IN OPERATING AGRICULTURAL VEHICLES

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to three-dimensional elevation modeling, and more particularly, to methods and systems to use in conjunction with the operation of one or more agricultural vehicles using three-dimensional elevation models to create three-dimensional guidance paths for the operation of agricultural vehicles in an area of operation.

BACKGROUND

The ability to optimize crop production of a particular tract of farmland often depends in part on whether one or more agricultural vehicles can operate along precise layout guidelines for the tract. These layout guidelines often indicate routes within the tract that the agricultural vehicles are to follow to perform a particular operation, for example, plowing or harvesting. The ability to precisely operate agricultural vehicles on a particular tract of farmland depends on a wide range of factors concerning the topography of the tract, including with out limitation the slope and contours of the tract, soil conditions, water levels, and areas where agricultural vehicles cannot operate such as structures and wildlife areas located on the tract. In addition, the capabilities of the vehicle and operator greatly influence whether an agricultural vehicle is able to follow precise layout guidelines for a particular tract. For example, an operator can better follow layout guidelines in circumstances where he or she is familiar with the variations of the terrain in the particular tract in which the individual is operating.

To assist in implementing the precise layout for a particular tract, operators generally rely on two-dimensional depictions of the layout guidelines that display the tract from a top-down or plan view. These typical two-dimensional layouts, however, cannot accurately account for many of the factors that impact the ability of agricultural vehicles to operate along the desired layout guidelines such as the slope and contours of the tract. As a result of these limitations, operators of agricultural vehicles must often employ judgment and guesswork to determine the optimal vehicle path based on the current operating conditions. In addition, even modern agricultural vehicles with sophisticated steering and other control systems may require significant manual control by the operator to account for operating conditions not displayed in two-dimensional tract layouts. For example, an operator may know that he or she must slow down an agricultural vehicle when operating on a particular tract within a portion of descending terrain that would not be depicted on a two-dimensional, top-down depiction of the layout guidelines. Finally, because of the potential need for significant manual intervention from the operator during operation of an agricultural vehicle, it is often difficult to obtain predictability and uniformity of operations between multiple vehicles operating within the same tract.

Accordingly, there is a need for enhanced modeling of agricultural areas to create three-dimensional guidance paths for agricultural vehicles that more reliably account for the actual operating conditions of the vehicles.

BRIEF SUMMARY

Certain embodiments provide tools and techniques that can create comprehensive guidance paths for agricultural vehicles to operate in an area of operation. In an aspect of particular embodiments, these techniques create three-dimensional guidance paths based on a digital elevation model created in part from location information for the area of operation obtained from a variety of sources. In other aspects of particular embodiments, these techniques also create the three-dimensional guidance paths using specific information about the area of operations such as areas of avoidance (e.g., structures located in the area), historical crop yields, water management information, and soil conditions. In other aspects, these techniques can revise the three-dimensional guidance paths using information collected from an operator and/or vehicle during operation. Particular embodiments can include a control system for the vehicle that can utilize the three-dimensional guidance paths to help facilitate the operation of the vehicle, including the operation of active implements of the vehicle such as a plow. Particular embodiments can also include generating inputs for the control system of an agricultural vehicle from a navigation and/or auto-pilot system whereby such inputs are based at least in part on the three-dimensional guidance paths.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Another set of embodiments provides a control system comprising a processor, a non-transitory storage medium, and a set of instructions executable by the processor. Such instructions can include, without limitation, instructions to receive three-dimensional location data for an area of operation; instructions to use the three-dimensional location data, in part, to create a digital elevation model for the area of operation; instructions to assign boundaries and areas of avoidance to the digital elevation model; and instructions to use the digital elevation model, in part, to create initial guidance paths for the area of operation. Instructions can further comprise instructions for incorporating information concerning the specific operating conditions within the area of operation into the three-dimensional guidance paths; instructions to incorporate specific vehicle parameters and task requirements into the three-dimensional guidance paths; instructions for approval of the three-dimensional guidance paths; instructions to display the three-dimensional guidance paths in an agricultural vehicle; and instructions to modify and/or adjust the three-dimensional guidance paths based on real-time conditions such as changes in specific operating conditions and/or vehicle performance.

A further set of embodiments provides computer systems. An exemplary system might comprise one or more processors and/or a non-transitory computer readable medium in communication with the one or more processors. In an aspect, the computer readable medium can have encoded thereon a set of instructions executable by the computer to perform one or more operations, including without limitation operations in accordance with methods provided by other embodiments. Merely by way of example, the set of instructions might comprise instructions to receive three-dimensional location data for an area of operation; instructions to use the three-dimensional location data, in part, to create a digital elevation model for the area of operation; instructions to assign boundaries and areas of avoidance to the digital elevation model; and instructions to use the digital elevation model, in part, to create initial guidance paths for the area of operation. Instructions can further comprise instructions for incorporating information concerning the specific operating conditions within the area of operation into the three-dimensional guidance paths; instructions to incorporate specific vehicle parameters and task requirements into the three-dimensional guidance paths; instructions for approval of the three-dimensional guidance paths; and instructions to display the three-dimensional guidance paths in an agricultural vehicle.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present inventions may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Figure 1:
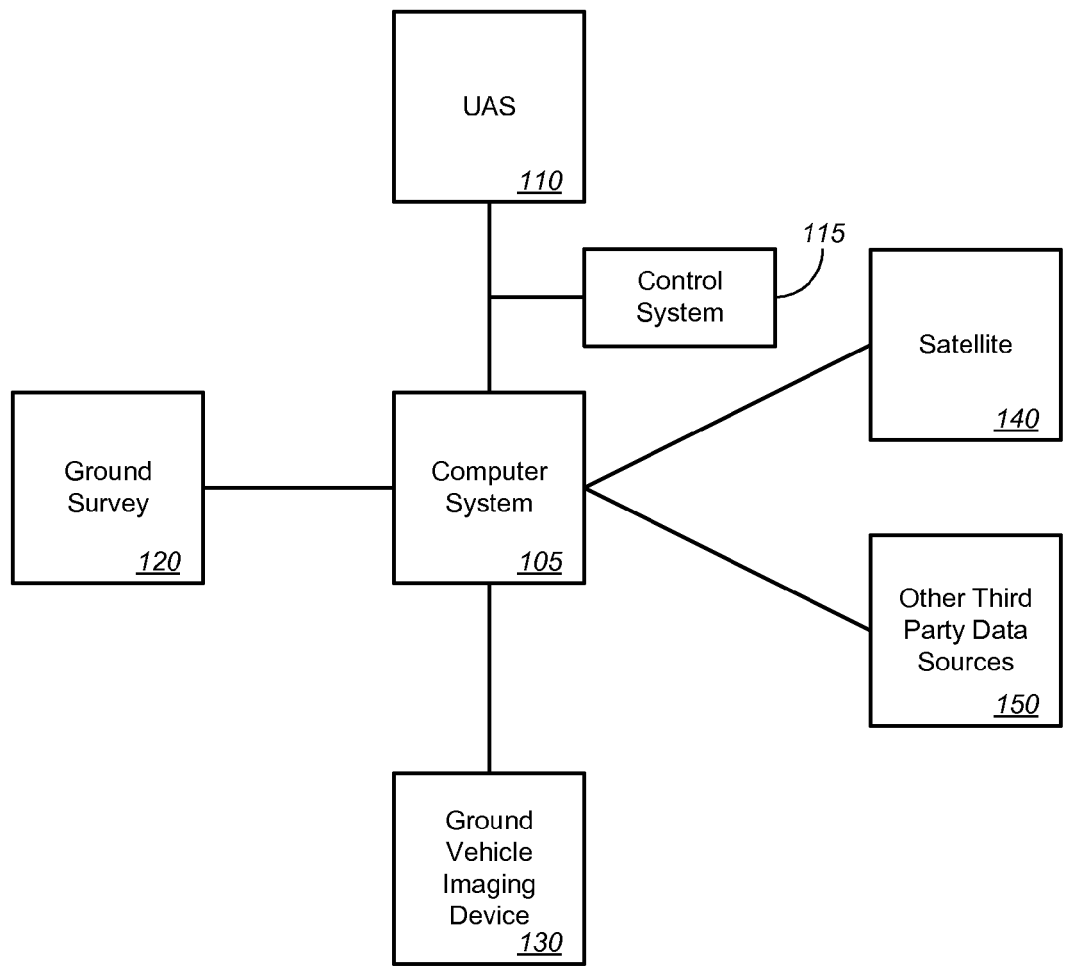
FIG. 1 is a block diagram illustrating various inputs to a computer system for creation of three-dimensional guidance paths, in accordance with various embodiments.

Certain embodiments provide tools and techniques that can create comprehensive guidance paths for agricultural vehicles to operate in an area of operation. In an aspect of particular embodiments, these tools allow for the operation of an agricultural vehicle using three-dimensional guidance paths for an area of operation. FIG. 1 illustrates an exemplary system 100 for creating three-dimensional guidance paths for an area of operation. The system 100 comprises a computer system 105, which can also be referred to as an "office system," a "server computer," and the like. In some instances, the computer system 105 might be implemented in a hosted (e.g., software as a service) and/or cloud computing environment or on an agricultural vehicle itself. The computer system 105 can be programmed to perform some or all of the operations and/or functions described herein, including but not limited to, the operations described below with regard to FIG. 2. In a general sense, the computer system 105 is programmed to receive three-dimensional location data for an area of operation from a variety of data sources and create three-dimensional guidance paths to assist in the operation of an agricultural vehicle within the area of operation. The computer system 105 can comprise a single computer or processor, a plurality of computers with various functions divided between them, the plurality of computers or processors arranged in a shared processing environment (e.g., a cloud computing environment, a grid computing environment, a computing cluster, and/or the like). Hence, when various functions are ascribed herein to the computer system 105, the reader should appreciate that such functionality can be aggregated and/or divided among one or more individual computers, and that the arrangement of such functionality among different computers or processors is discretionary.

The computer system 105 may be in communication with a plurality of data sources to receive three-dimensional location data for an area of operation (e.g., location information with X, Y, and Z coordinates) often as known in the art as point clouds in three-dimensional coordinate systems. In some embodiments, these data sources can be considered part of the system 105, while in other embodiments, the system might comprise the computer system 105 alone. Some examples of such data sources 110-150 are illustrated on FIG. 1 and discussed in detail below, but different embodiments can use a variety of data sources and should not be considered to be limited to those illustrated on FIG. 1.

The computer system 105 can communicate with data sources using a wide variety of techniques. For example, in some cases, a data source might include media, such as a flash drive, which can be removed from the data source and inserted into the computer system 105 to upload data. In other cases, the computer system 105 might communicate with a data source over a network, which might be a wired network, wireless network, private network, public network, virtual private network, and/or the like, depending on the capabilities of the data source and implementation-specific considerations. In a general sense, the computer system 105 can use any appropriate mode of communication to exchange data with various data sources, including without limitation any number of standard (including open source) and proprietary formats.

An example of a data source that can be employed by some embodiments is an aircraft and/or unmanned aerial system ("UAS") 110. While FIG. 1 illustrates a UAS, it should be appreciated that other aerial platforms, both manned and unmanned, can be used for data collection in different embodiments. In some cases, the UAS 110 is controlled by an external or internal control system 115, which can serve to communicate data between the UAS 110 and the computer system 105 (with which the control system 115 might be in contact). In other cases, the UAS 110 might communicate directly with the computer system 105 and/or might store field data on removable media for later upload to the computer system 105. In yet other aspects, control system 115 can be an application on a handheld computer.

A number of different types of UAS 110 can be used in accordance with various embodiments. Examples include the UX5™ and X100™, commercially available from Trimble UAS. In addition, the UAS described in International Publication No. WO 2011/131382, filed by Gatewing Nev. and published Oct. 27, 2011, and U.S. patent application Ser. No. 13/685,375, filed Nov. 26, 2012 by Joyce et al., both of which are incorporated herein by reference for all purposes. In particular, the Joyce application describes a system for performing aerial photogrammetric surveys, and such surveys can be used to collect three-dimensional location data for any area of operation.

Hence, in one aspect, a UAS 110 can be used to collect photographic field data for an area of operation, which can be analyzed photogrammetrically as needed to identify various dimensional and/or positional data about the topographic features for an area of operation. In a particular aspect of some embodiments, the feature data set can be produced by analyzing the aerial imagery photogrammetrically. A variety of photogrammetric techniques are described, for example, in provisional U.S. Patent Application No. 61/710,486, filed Oct. 5, 2012 by Grässer et al. and entitled "Enhanced Position Measurement Systems and Methods," U.S. Publication No. 2012/0166137 A1, filed by Grässer et al., published Jun. 28, 2012, and entitled "Enhanced Position Measurement Systems and Methods," U.S. Publication No. 2012/0163656 A1, filed by Wang et al., published Jun. 28, 2012, and entitled "Method and Apparatus for Image-Based Positioning, U.S. Publication No. 2011/0064312 A1, filed by Janky et al., published Mar. 17, 2011, and entitled "Image-Based Georeferencing," and U.S. Pat. No. 7,991,575, filed by Vogel et al. and entitled "Method and System for Measuring Angles Based on 360 Degree Images," all of which are incorporated herein by reference.

In some aspects, for example, the photographs taken by a UAS 110 can be analyzed to perform automatic aerial triangulation and/or bundle block adjustment (as known in the art) to georeference the photographs and/or orient a mosaic of photographs relative to each other. The UAS 110 can also capture raw images, near infrared (NIR) and color infrared (CM) images of the same area, which can be analyzed to produce orthophotographs, to determine geographic features (e.g., roads, intersections, buildings, etc., as well as other features that can be used to orient the photograph). Additionally and/or alternatively, however, a UAS 110 can carry additional sensor packages that can collect field data other than photographic data. Merely by way of example, a UAS 110 might have a light detection and ranging ("LIDAR") or laser sensor, which can gather topographic data for an area of operation. These operations can also produce point clouds in three-dimensional coordinate systems for an area of operation.

In some cases, a one or more terrestrial (ground) survey instruments 120 and/or a vehicular imaging device 130 can collect field data and/or serve as a data source. This field data can be combined with feature data obtained from the aerial imagery, for example as described above. In particular cases, a terrestrial survey instrument 120 might capture panoramic imagery, which can be integrated with aerial imagery captured by the UAS 110, in accordance with embodiments discussed below. Terrestrial survey instruments 120 can include a variety of different instruments, including without limitation those known to skilled artisans in the surveying field. Such instruments can include, without limitation, total stations (such as those available from Trimble Navigation Ltd.), global navigation satellite system ("GNSS") receivers, laser scanners (including three-dimensional laser scanners, electronic distance measurement ("EDM") systems that employ lasers to measure distances, etc.) and/or any other instruments that can be used to collect feature data about the area of operation. Such feature data can include, but is not limited to, position data about tie points, reference points, and/or features of interest in the subject area, azimuth data, and/or the like.

A portable scanner can include any number of devices used for geospatial data collection, including in particular a total station or a rover as described in U.S. Publication No. 2012/0166137 A1 as cited and incorporated by reference above. An agricultural vehicle can be equipped with similar hardware to provide a vehicular imaging device 130. More generally, a vehicular imaging device 130 can include cameras and/or the same (or similar) types of sensors described above with respect to the UAS 110 and can capture the same type of data, which can be subjected to the same type of analysis (either on the device or on the computer system 105 after upload, or both).

The computer system 105 might also access third party data, which can include images from satellite 140 and/or other field data gathered by third parties 150, including without limitation geographical feature data, map data, and/or any other type of data that can be used to generate three-dimensional location data for the area of operation. In some cases, the computer system 105 might include an interface to exchange data with third party sources (e.g., using an XML interface, an open database connection ("ODBC") interface, etc.). In other cases, the computer system 105 can be programmed to receive data in standard (including open source) and/or proprietary formats, such as shapefile, geodatabase, Keyhole Markup Language ("KML"), "0.3ds" format, Building Information Modeling ("BIM") Collaboration Format ("BCF"), eXtensible Markup Language ("XML") file formats, International Standard Organization ("ISO") files, and Trimble Universal Variable Rate ("TUVR") protocol formats. Using such formats, data can be exchanged with a number of third party data sources 150.

Figure 2:
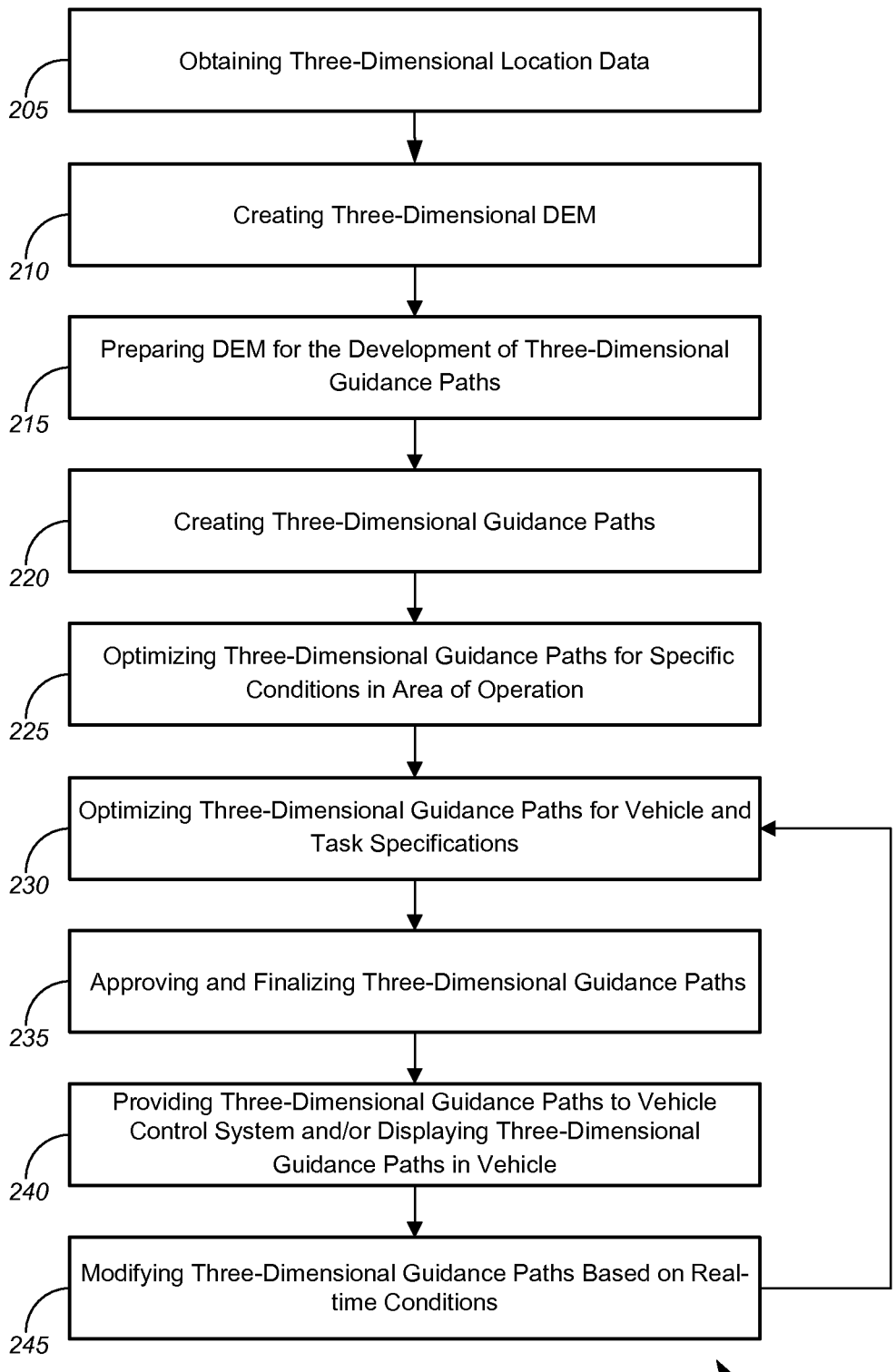
FIG. 2 is a process flow diagram illustrating methods for creating three-dimensional guidance paths, in accordance with various embodiments.

FIG. 2 illustrates an exemplary method 200 that can be used for creating three-dimensional guidance paths for operating a vehicle in an area of operation. It should be appreciated that the various techniques and procedures of these methods can be combined in any suitable fashion, and that, in some embodiments, the operations depicted by FIG. 2 can be considered interoperable and/or as portions of a single method; nonetheless, some methods might include only a subset of the operations depicted on FIG. 2. Similarly, while the techniques and procedures are depicted on FIG. 2 and/or described in a certain order for purposes of illustration, it should be appreciated that certain procedures may be reordered and/or omitted within the scope of various embodiments.

In some embodiments, a method 200 might comprise obtaining three-dimensional location data in block 205 from a variety of sources for an area of operation such as those set forth in FIG. 1. As noted above, the three-dimensional location data can include a variety of different types of data, including in particular, data (such as photographic data, LIDAR, laser offset, or other scanner data) for an area of operation such as a field or other area in which an agricultural vehicle needs to operate. Techniques used to collect field data can vary with the nature of the field data itself. Merely by way of example, as noted above, a number of field data collectors can be used to collect field data; such collectors can include, without limitation, a UAS (or other aerial platform), an application running on mobile device (such as a handheld computer, which might or might not employ a sensor, e.g., a laser, to collect some of the data), a vehicular imaging device, terrestrial and/or aerial survey devices (such as total stations, cameras, and/or the like).

At block 210, the method 200 can comprise using the three-dimensional location data to create a three-dimensional model of the area of operation often referred to as a digital elevation model ("DEM"), digital terrain model, or digital surface model. While each of these terms can have specific meanings within the industry (e.g., a digital terrain model may only account for the earth's surface without manmade objects, such as houses, and a digital terrain model may account for the earth's surface with manmade objects), these terms are used interchangeably herein to refer to any three-dimensional model of an area of operation. More specifically, a DEM is a digital representation of the ground surface topography and can be represented in a variety of forms including without limitation raster and triangular irregular network ("TIN"). Similar to the collection of the three-dimensional location data, the creation of the DEM can be accomplished using a variety of different techniques, depending on a number of factors including the nature of the three-dimensional location data.

Software solutions such as Trimble Business Center™ ("TBC"), as well as other software packages, available from Trimble Navigation Ltd., can create a DEM for an area of operation from three-dimensional location data collected from the sources such as those set forth in FIG. 1. The location data can be imported into the software along with information related to its collection. For example with respect to aerial or terrestrial images, the collected information may include information such as the location of the images as well as the orientation and calibration of the camera or cameras taking the images. Depending on the source of the date and the collection conditions, substantial or little error, including geometric error, may be present in the data. The software can then correct for errors such as geometric errors created by, among other things, the angle from which the images were taken using a number of methods. For example, adjustments can be made to account for geometric error in aerial or terrestrial images using tie points, which are features that can be located in two or more adjacent images. The software can match tie points over the area of operation and adjust the images to account for geometric errors. Once adjusted to account for errors, the images can be used to create a DEM through using the images along with, for example, ground control points for the area of operation. In general, ground control points are identifiable locations in the images with known precise three-dimensional Cartesian or geodetic coordinates. Typically, ground control points are identified before the images of an area operation are taken by the terrestrial or aerial means described above. Once the DEM is completed, three-dimensional coordinates are known for each location within the area of operation.

At block 215, the method 200 can comprise preparing the DEM for an area of operation for the development of initial guidance paths. This step in method 200 can include assigning outer boundaries in the DEM to set forth the area of operation. In addition, contour lines can be added to the DEM, which among other things help to determine the most optimal paths for agricultural vehicles to take within an area of operation. Again, software programs such as TBC or FarmWorks™ available from Trimble Navigation, Ltd. can be used to create contour lines within the DEM for an area of operation. In addition, locations within an area of operation that should be avoided by agricultural equipment can be identified within the DEM. For example, avoidance areas can include buildings and infrastructure such as roads. Avoidance areas can also include easements, watersheds, wildlife areas, and locations within the area of operation where the operation of agricultural vehicles is not desired at a particular time (e.g., a portion of a field that was previously planted or harvested). In addition, the DEM of the area of operation can help identify areas that can be optimized to create additional useable land through the use of earthmoving equipment and other technology that can be utilized to level and/or backfill areas that were previously unusable or less than optimal for the desired agricultural operation.

Figure 3:
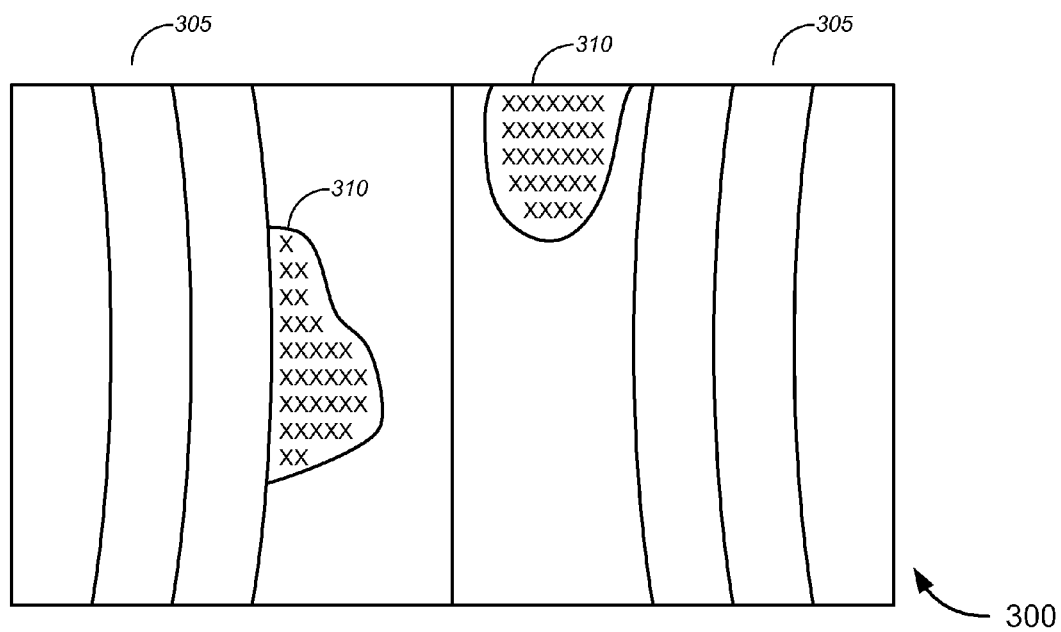
FIG. 3 is simplified diagram of a digital evaluation model for a particular area of operation, in accordance with various embodiments.

For example, FIG. 3 depicts a greatly simplified example of the DEM 300 of an area of operation. As shown in FIG. 3, the contour lines 305 have been added depicting the comparatively steep nature of the area of operation on the left and right boundaries of the area. In addition, areas where vehicles should not operate are designated as 310 in FIG. 3 (which are referred to herein as avoidance areas or avoidance locations) have been added to the DEM. As a result, the potential usable area of vehicle operation is depicted as the area within the DEM boundaries and outside of the avoidance areas.

At block 220 of method 200, the initial three-dimensional guidance paths area created from the DEM. The development of initial three-dimensional guidance paths help to create an optimal path for which one or more agricultural vehicles can operate based on the terrain and other features of the area of operation. Such features can include size of the area, access points for the agricultural vehicles, slope of the terrain, and number and location of avoidance areas. The initial guidance paths can also be based in part on minimizing the amount of time needed for the agricultural vehicles to complete the desired task by, for example, identifying initial guidance paths that reduce the number of turns needed for each vehicle. The initial guidance paths can also be based on historical operations within the area of operation (e.g., planting or harvesting patterns for the area of operation).

Figure 4:
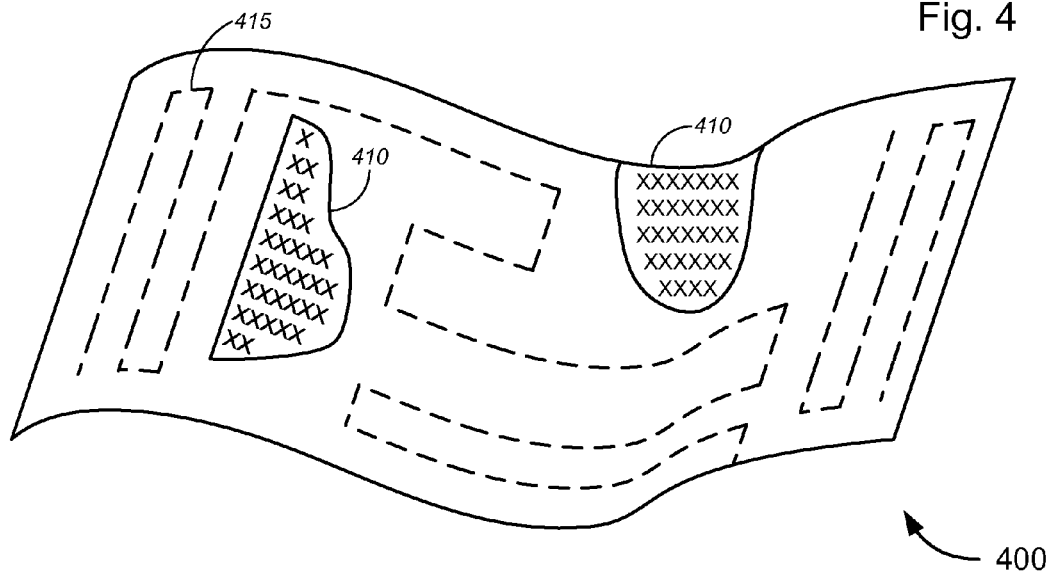
FIG. 4 is a simplified diagram of a three-dimensional guidance path for an area of operation, in accordance with various embodiments.

A simplified example of initial guidance paths are shown as part of the DEM 400 in FIG. 4. Specifically, initial guidance paths 415 are shown in FIG. 4. Due to the comparatively steeper nature of the areas near the left and right boundaries of the area of operation in this example, the initial guidance paths direct the vehicles to traverse the steeper terrain in one direction and the middle of the area of operation in another direction. As one of skill in the art would appreciate, the initial guidance paths may be adjusted based on the specific nature of operation and type of agricultural vehicle being used for the operation. For example, one particular type of tractor may be able to easily ascend and descend the steeper terrain depicted on FIG. 4, which may justify adjusting the initial guidance paths to traverse directly across the entire area of operation from left to right instead of accounting for steeper areas as depicted in FIG. 4.

After the creation of the initial guidance paths, the initial guidance paths can be further optimized based on the specific conditions within the area of operation, as shown in block 225 of method 200. The specific conditions of the area of operation can include, without limitation, soil conditions, moisture content, average rainfall, crop types, historical crop yield data, and fertilizer and/or other nutrient information used within the area of operation. Such conditions can have a significant impact on the ability of the agricultural vehicles to efficiently operate along the initial three-dimensional guidance paths. For example, certain soil types such as clays often retain excess water and create limited traction conditions. In cases of limited traction conditions, the initial guidance paths may need to be adjusted to account for these conditions (e.g., the initial guidance paths may need to be re-routed to avoid areas with inclines in excess of a certain slope or particular low-lying areas due to reduced traction based on soil type and/or current rainfall conditions). By way of another example, certain crops may need additional space between rows for optimal growing conditions. In such a case, the initial guidance paths would be adjusted based on the type of crop being planted in order to account for less passes of the agricultural vehicles within the area of operation. In addition, historical crop yield data may indicate that a particular field layout resulted in higher crop yield in which case the initial guidance paths could be adjusted to better replicate this historical field layout.

Similarly, in block 230 of method 200, the initial guidance paths are further optimized based on the specifications of the agricultural vehicles operating in the area of operation as well as the specific tasks to be performed by the vehicles. For example, with respect to vehicle specifications, vehicle characteristics such as vehicle width and turn radius can have a significant impact on the ability of the vehicle to precisely follow certain guidance paths. The initial guidance paths can be reviewed to ensure that the specific agricultural vehicles that will be working in the area of operation are able to follow the initial guidance paths and, if not, the initial guidance paths can be modified to account for vehicle limitations. In addition, if the particular agricultural vehicles operating the area of operation perform optimally in certain conditions, the initial guidance paths can also be modified in a way to optimize vehicle performance. For example, if a particular agricultural vehicle operates most fuel-efficiently between 10-15 miles per hour, the initial guidance paths can be adjusted in a way to help ensure that the vehicle will be able to operate in this range for the maximum amount of time while working in the area of operation. Such optimization can be implemented in a variety of ways including without limitation through user input and/or automatically through the computer system 105 based on inputs related to the vehicle's specification and/or the vehicle's historical performance in the area of operation.

In addition to be optimized to account for vehicle specification, the initial guidance paths can be further optimized to account for the particular task to be performed by the vehicle in the area of operation. For example, if a vehicle is to be pulling a particularly heavy plow to accomplish a particular task that will create reduced traction (e.g., a tile plow for installed tile drainage), the initial guidance paths can be further adjusted to account of the limited traction environment by reducing the number of turns and/or eliminating any paths that would require the vehicle to ascend or descend grades over a specific slope. In addition, if multiple vehicles with different capabilities are working within the same area of operation, the initial guidance paths in the area of operation can be divided and assigned to the vehicle best equipped to follow the guidance paths in each specific location within the area of operation.

After the initial guidance paths are optimized, the guidance paths may be approved and finalized (for example, based on user input received from an operator) in block 235 of method 200. The approval of the initial guidance paths can take many forms. In certain embodiments, the guidance paths will be displayed as three-dimensional guidance paths in the area of operation within the DEM and displayed on a screen in an office computer and/or within a display in the agricultural vehicle. The approval may be conducted by someone with knowledge of the area of operation and will often help to ensure that the guidance paths are appropriate for the area of operation. In addition, because the guidance paths will be displayed in three-dimensions, it will be easier to approve the guidance paths because the guidance paths can be displayed on the actual topography of the area of operation, which will make it easier to confirm the adequacy and appropriateness of the guidance paths.

At block 240, the three-dimensional guidance paths for the area of operation can be provided to a control system for an agricultural vehicle and/or displayed within the vehicle. These three-dimensional guidance paths can be used to help operate the vehicle in a number of ways. For example, the three-dimensional guidance paths can be utilized with the agricultural vehicle's global navigation satellite system ("GNSS") and/or auto-pilot steering system such as those systems available through Trimble Navigation Ltd. Specifically, with respect to auto-pilot systems, such systems will typically have functionality that can include gyroscopes, inclinometers, accelerometers, and/or other types of algorithms. In certain aspects, when used in conjunction with a GNSS, the three-dimensional guidance paths will enable the operator of the agricultural vehicle to precisely follow the guidance paths as they better match the actual operating conditions within the area of operation than if the guidance paths were only displayed in two dimensions. In contrast to operating an agricultural vehicle utilizing two-dimensional guidance paths, the operation of an agricultural vehicle utilizing three-dimensional guidance paths in conjunction with a GNSS and/or auto-pilot steering system often requires less manual intervention and real time decision making from the operator.

Specifically, when utilizing two-dimensional guidance paths, operators routinely have to rely on training and experience to decide whether a vehicle can navigate a particular guidance path based on variations in terrain that are not reflected in the two-dimensional guidance paths. However, by accounting for elevation changes and specific terrain conditions in the development of three-dimensional guidance paths, the vehicle's control system can far better control the operation of the vehicle to navigate the three-dimensional guidance paths. For example, in circumstances where the agricultural vehicle is utilizing the three-dimensional guidance paths with an auto-pilot steering system, the three-dimensional guidance paths can be used to generate inputs for the vehicle's control system that can control the engine of the vehicle, including without limitation the vehicle's throttle, to slow it down or speed it up as it is either ascending or descending the terrain reflected in the three-dimensional guidance paths. Similarly, the three-dimensional guidance paths can be used to generate inputs for the vehicle's control system to control active implements (e.g., a plow) as the vehicles operate along the guidance paths. For example, based on the inputs generated from the guidance paths, the control system for the vehicle may further lower a plow a certain amount when the vehicle is traversing down an incline or raise the plow a certain amount when the vehicle is traversing up an incline. Because this expanded terrain information is incorporated in the development of the three-dimensional guidance paths, the one or more agricultural vehicles can be operated with less required operator invention and more certainty concerning whether the assigned vehicles can complete the desired task and the time it will take to complete the task.

In addition, as the agricultural vehicle operates in the area of operation, the three-dimensional guidance paths can be shown on a display located in the vehicle. As the agricultural vehicle maneuvers along the three-dimensional guidance paths, the vehicle's location can be tracked on the display. In certain embodiments, the location of the agricultural vehicle can be sent back to computer system 105 (as shown in FIG. 1), in order to allow the system to track the progress of the agricultural vehicle in completing the desired operation. In such circumstances, the control system of the vehicle, which can include the vehicle's GNSS and/or auto-pilot steering system, can communicate the current operating status of the vehicle, including without limitation its location, operating speed, and current fuel status, to system 105. Such communication can be conducted using a wireless communication device (such as a Bluetooth™ device, an 802.11 device, a WiFi device, a WiMax device, cellular communication facilities, etc.) on a real time or fixed interval basis. Alternatively, such communication also can be conducted via manual transfer on a regular basis using, for example, a USB device. In addition, as the agricultural vehicle operates along the three-dimensional guidance paths, the vehicle can also transmit information concerning the current conditions within the area of operation to system 105, which can then update and/or modify the three-dimensional guidance paths to reflect this additional or new information.

In certain embodiments, three-dimensional guidance paths for an area of operation as well as additional information, including without limitation, the location and operating status of multiple vehicles, can be shared among a number of agricultural vehicles operating in the area of operation and/or computer system 105 as shown in FIG. 1. As the multiple agricultural vehicles operate in the area of operation, the location, progress, and operating status of each vehicle can be tracked by computer system 105 and/or each of the agricultural vehicles in the area of operation. When multiple agricultural vehicles are operating in the area of operation, each vehicle can be assigned a specific portion of the three-dimensional guidance paths to operate within. As the agricultural vehicles are operating in their respectively assigned areas, the computer system 105 can adjust and/or reassign vehicles to portions of the three-dimensional guidance paths depending on the progress of each respective vehicle and/or changes in operating conditions within the area of operation or the operating status of the vehicles (e.g., if one vehicle is rendered inoperable due to a mechanical problem, another vehicle may be assigned its remaining portion of the three-dimensional guidance paths to complete).

In addition, after the three-dimensional guidance paths are provided to the agricultural vehicle's control system and/or displayed in the agricultural vehicle, the three-dimensional guidance paths can be modified to account for any number of changes, including changes in actual operating conditions or vehicle performance or changes in the desired field layout. As a result, block 245 with a loop back to block 230 indicates an iterative process in which the three dimensional guidance paths can be continually modified real-time as the agricultural vehicle(s) is/are operating along the three-dimensional guidance paths. Such modifications can be made in any number of ways, including automatically by the vehicle control system or manually by operator input.

Figure 5:
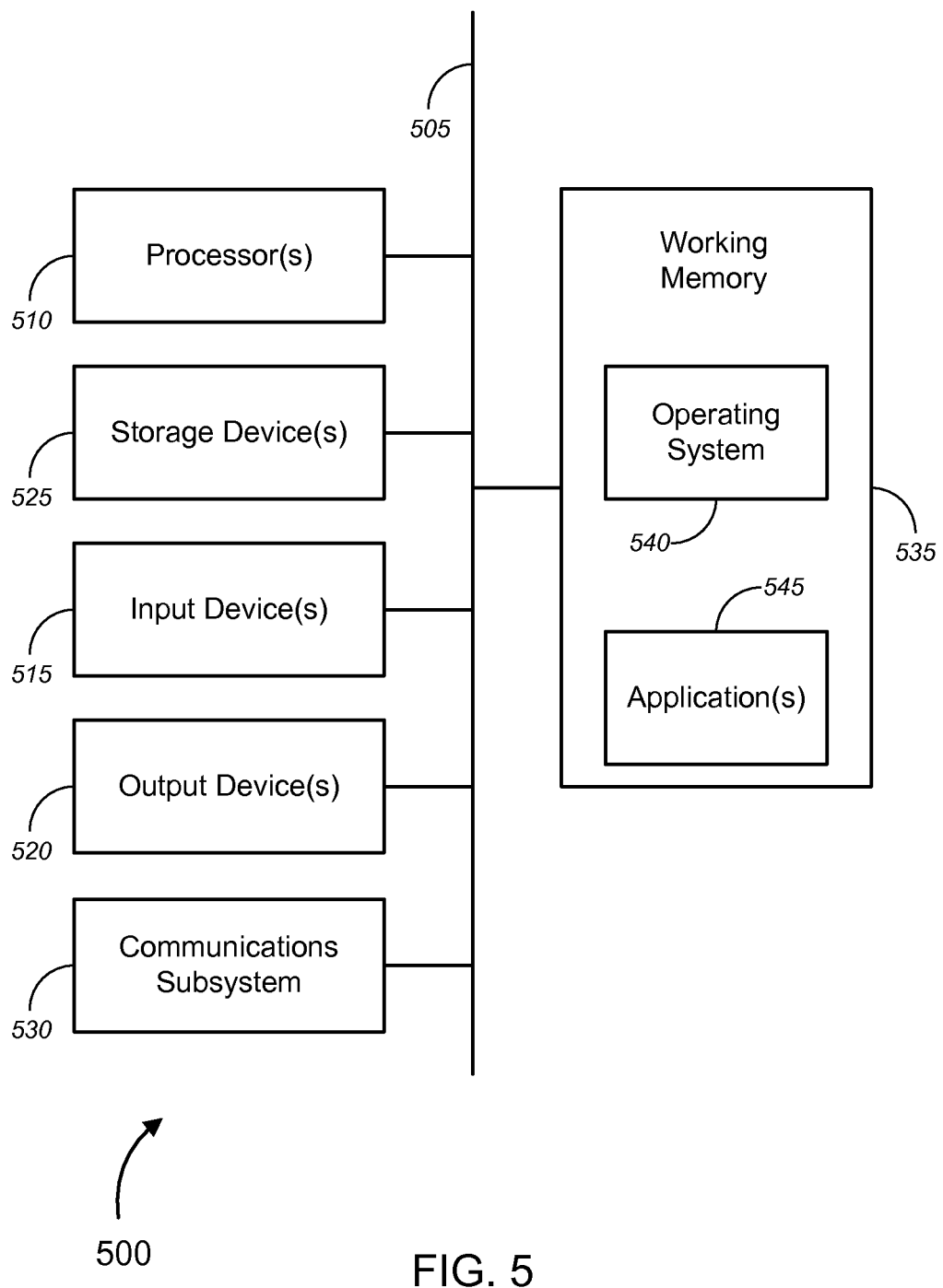
FIG. 5 is a generalized schematic diagram illustrating a computer system, in accordance with various embodiments.

FIG. 5 provides a schematic illustration of one embodiment of a computer system 500 that can perform the methods provided by various other embodiments, as described herein, and/or can develop, create, and/or display three-dimensional guidance paths for agricultural vehicles as described herein. It should be noted that FIG. 5 is meant only to provide a generalized illustration of various components, of which one or more (or none) of each component may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include one or more processors 510, including without limitation one or more general-purpose processors and/or one or more special-purpose processors (such as digital signal processing chips, graphics acceleration processors, and/or the like); one or more input devices 515, which can include without limitation a mouse, a keyboard, touch screen, a tablet, and/or the like; and one or more output devices 520, which can include without limitation a display device, a printer, and/or the like.

The computer system 500 may further include (and/or be in communication with) one or more storage devices 525, which can comprise, without limitation, local and/or network accessible storage, and/or can include, without limitation, a disk drive, a drive array, an optical storage device, a solid-state storage device such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 500 might also include a communications subsystem 530, which can include without limitation a modem, a network card (wireless or wired), an infra-red communication device, a wireless communication device, and/or a chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer systems, and/or with any other devices described herein. In many embodiments, the computer system 500 will further comprise a working memory 535, which can include a RAM or ROM device, as described above.

The computer system 500 also may comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 500) to perform methods in accordance with various embodiments of the invention. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. Such a medium may take many forms, including but not limited to, non-volatile media, volatile media, and transmission media. Non-volatile media includes, for example, optical and/or magnetic disks, such as the storage device(s) 525. Volatile media includes, without limitation, dynamic memory, such as the working memory 535. Transmission media includes, without limitation, coaxial cables, copper wire, and fiber optics, including the wires that comprise the bus 505, as well as the various components of the communication subsystem 530 (and/or the media by which the communications subsystem 530 provides communication with other devices). Hence, transmission media can also take the form of waves (including without limitation radio, acoustic, and/or light waves, such as those generated during radio-wave, and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500. These signals, which might be in the form of electromagnetic signals, acoustic signals, optical signals and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc., carried by the signals) to the working memory 535, from which the processor(s) 505 retrieves and executes the instructions. The instructions received by the working memory 535 may optionally be stored on a storage device 525 either before or after execution by the processor(s) 510.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method of operating an agricultural vehicle, the method comprising:
   obtaining, with a computer, three-dimensional location information for multiple positions within an area of operation;
   creating, with the computer, a three-dimensional elevation model for the area of operation, based at least in part on the three-dimensional location information;
   developing, with the computer, one or more three-dimensional guidance paths for the operation of the agricultural vehicle within the area of operation, based at least in part on the three-dimensional elevation model;
   determining, with the computer, whether one or more positions within the area of operation afford reduced traction for the agricultural vehicle based on a combination of slope, soil type, and current rainfall conditions of each of the one or more positions;
   adjusting, with the computer, the one or more three-dimensional guidance paths for the operation of the agricultural vehicle within the area of operation, based at least in part on a determination that one or more positions within the area of operation afford reduced traction for the agricultural vehicle based on a combination of slope, soil type, and current rainfall conditions of each of the one or more positions; and
   providing, with the computer, information to a control system of the agricultural vehicle, the information comprising data representing the one or more three-dimensional guidance paths.

2. The method of claim 1, further comprising:
   identifying one or more avoidance locations within the area of operation in which the agricultural vehicle should not operate; and
   utilizing the avoidance locations within the three-dimensional elevation model to further develop the one or more three-dimensional guidance paths.

3. The method of claim 1, wherein developing, with a computer, the one or more three-dimensional guidance paths comprises developing the one or more three-dimensional guidance paths, based at least in part on growing conditions within the area of operation.

4. The method of claim 3, wherein the growing conditions comprise one or more soil characteristics of at least a portion of the area of operation.

5. The method of claim 3, wherein the growing conditions comprise historical crop yield data of at least a portion of the area of operation.

6. The method of claim 3, wherein the growing conditions comprise water management data for at least a portion of the area of operation.

7. The method of claim 3, wherein the growing conditions comprise fertilizer and nutrient data for a least a portion of the area of operation.

8. The method of claim 1, further comprising:
   facilitating, with the control system of the agricultural vehicle, the operation of the agricultural vehicle utilizing the one or more three-dimensional guidance paths.

9. The method of claim 8, further comprising:
   generating inputs for the control system of the agricultural vehicle to control a throttle of the agricultural vehicle based at least in part on the one or more three-dimensional guidance paths.

10. The method of claim 9, wherein facilitating, with the control system of the agricultural vehicle, the operation of the agricultural vehicle comprises controlling the throttle of the agricultural vehicle while the agricultural vehicle operates along the one or more three-dimensional guidance paths.

11. The method of claim 8, further comprising:
    generating inputs for the control system to control an active implement of the agricultural vehicle, based at least in part on the three-dimensional elevation model.

12. The method of claim 11, wherein facilitating, with the control system of the agricultural vehicle, the operation of the agricultural vehicle comprises controlling the active implement of the agricultural vehicle while the agricultural vehicle operates along the one or more three-dimensional guidance paths.

13. The method of claim 8, further comprising:
    revising the one or more three-dimensional guidance paths, based on data collected from the agricultural vehicle during operation.

14. The method of claim 8, further comprising:
    revising the one or more three-dimensional guidance paths, based on data collected from an operator of the agricultural vehicle during operation.

15. The method of claim 8, wherein the computer is located on the agricultural vehicle.

16. The method of claim 8, wherein facilitating, with the control system of the agricultural vehicle, the operation of the agricultural vehicle comprises displaying, with a display in the agricultural vehicle, the one or more three-dimensional guidance paths for the area of operation, to guide an operator of the agricultural vehicle.

17. The method of claim 8, further comprising:
    sharing the one or more three-dimensional guidance paths with a second agricultural vehicle.

18. The method of claim 17, further comprising:
    dividing up the area of operation between the first and second agricultural vehicles such that each vehicle operates in the area of operation along different portions of the one or more three-dimensional guidance paths.

19. The method of claim 8, further comprising:
receiving, with the control system, inputs from a navigation system, wherein facilitating operation of the agricultural vehicle comprises comparing the inputs from the navigation system with the one or more three-dimensional guidance paths.

20. The method of claim 8, further comprising:
generating inputs for the control system from an auto-pilot system to control a steering system of the agricultural vehicle based at least in part on the one or more three-dimensional guidance paths.

21. The method of claim 20, wherein facilitating, with the control system of the agricultural vehicle, the operation of the agricultural vehicle comprises controlling the steering system of the agricultural vehicle with the auto-pilot system while the agricultural vehicle operates along the one or more three-dimensional guidance paths.

22. A control system for an agricultural vehicle, the control system comprising:
one or more processors; and
a computer readable medium in communication with the one or more processors, the computer readable medium having encoded thereon a set of instructions executable by the computer system to perform one or more operations, the set of instructions comprising:
instructions for receiving a three-dimensional elevation model for an area of operation based at least in part on three-dimensional location information for multiple positions within the area of operation;
instructions for displaying, with a display in the agricultural vehicle, the one or more three-dimensional guidance paths for the area of operation, to guide an operator of the agricultural vehicle;
instructions for determining whether one or more positions within the area of operation afford reduced traction for the agricultural vehicle based on a combination of slope, soil type, and current rainfall conditions of each of the one or more positions;
instructions for adjusting the one or more three-dimensional guidance paths for the operation of the agricultural vehicle within the area of operation, based at least in part on a determination that one or more positions within the area of operation afford reduced traction for the agricultural vehicle based on a combination of slope, soil type, and current rainfall conditions of each of the one or more positions; and
instructions for facilitating operation of the agricultural vehicle utilizing the one or more three-dimensional guidance paths.

23. A computer system, comprising:
one or more processors; and
a computer readable medium in communication with the one or more processors, the computer readable medium having encoded thereon a set of instructions executable by the computer system to perform one or more operations, the set of instructions comprising:
instructions for obtaining three-dimensional location information for multiple positions within an area of operation;
instructions for creating a three-dimensional elevation model for the area of operation, based at least in part on the three-dimensional location information;
instructions for developing one or more three-dimensional guidance paths for the operation of an agricultural vehicle within the area of operation, based at least in part on the three-dimensional elevation model;
instructions for determining whether one or more positions within the area of operation afford reduced traction for the agricultural vehicle based on a combination of slope, soil type, and current rainfall conditions of each of the one or more positions;
instructions for adjusting the one or more three-dimensional guidance paths for the operation of the agricultural vehicle within the area of operation, based at least in part on a determination that one or more positions within the area of operation afford reduced traction for the agricultural vehicle based on a combination of slope, soil type, and current rainfall conditions of each of the one or more positions;
instructions for providing information to a control system of the agricultural vehicle, the information comprising data representing the one or more three-dimensional guidance paths;
instructions for the control system of the agricultural vehicle to facilitate the operation of the agricultural vehicle utilizing the one or more three-dimensional guidance paths; and
instructions for modifying the information comprising data representing the one or more three-dimensional guidance paths during the operation of the agricultural vehicle.

* * * * *